(12) United States Patent
Khaldi et al.

(10) Patent No.: US 10,556,243 B2
(45) Date of Patent: Feb. 11, 2020

(54) SEALING DEVICE AND APPLICATION SYSTEM COMPRISING SUCH A DEVICE

(71) Applicant: Exel Industries, Epernay (FR)

(72) Inventors: Boussif Khaldi, Arnouville (FR); Johan Le Cardinal, Champs sur Marne (FR)

(73) Assignee: Exel Industries, Epernay (FR)

( * ) Notice: Subject to any disclaimer, the term of this patent is extended or adjusted under 35 U.S.C. 154(b) by 67 days.

(21) Appl. No.: 15/331,836

(22) Filed: Oct. 22, 2016

(65) Prior Publication Data

US 2017/0113233 A1 Apr. 27, 2017

(30) Foreign Application Priority Data

Oct. 26, 2015 (FR) ...................... 15 60190

(51) Int. Cl.

| | | |
|---|---|---|
| F16J 15/32 | (2016.01) | |
| B05B 1/32 | (2006.01) | |
| F16J 15/322 | (2016.01) | |
| F16J 15/3208 | (2016.01) | |
| B05B 9/04 | (2006.01) | |
| B05B 1/30 | (2006.01) | |
| B05B 9/01 | (2006.01) | |
| B05B 11/00 | (2006.01) | |
| F16J 15/02 | (2006.01) | |
| B05B 7/12 | (2006.01) | |

(Continued)

(52) U.S. Cl.
CPC .............. *B05B 1/32* (2013.01); *B05B 1/3046* (2013.01); *B05B 9/01* (2013.01); *B05B 9/0426* (2013.01); *B05B 11/30* (2013.01); *F16J 15/022* (2013.01); *F16J 15/322* (2013.01); *F16J 15/3208* (2013.01); *B05B 7/12* (2013.01); *B05B 7/2416* (2013.01); *B05B 7/30* (2013.01)

(58) Field of Classification Search
CPC .... B05B 1/32; B05B 7/12; B05B 9/01; B05B 11/30; F16J 15/022; F16J 15/3208; F16J 15/322; F16J 15/3212; F16J 15/3236; F16J 15/3204
See application file for complete search history.

(56) References Cited

U.S. PATENT DOCUMENTS

| | | | | |
|---|---|---|---|---|
| 3,807,513 A | * | 4/1974 | Kern | ...................... E21B 4/003 |
| | | | | 175/107 |
| 4,261,583 A | | 4/1981 | de Vries, Jr. et al. | |

(Continued)

FOREIGN PATENT DOCUMENTS

| | | | |
|---|---|---|---|
| FR | 2 175 417 A5 | 10/1973 | |
| GB | 1423778 | * 2/1976 | ............... F16J 15/18 |

OTHER PUBLICATIONS

FR 15 60190, Rapport de Recherche Préliminaire, May 27, 2016, 2 pages.

*Primary Examiner* — Alexander M Valvis
(74) *Attorney, Agent, or Firm* — Soquel Group LLC

(57) ABSTRACT

A sealing device for a system for applying a liquid coating product comprises an inner conduit suitable for sealably surrounding an actuating rod of the application system, a frame and a sealing gasket made from a synthetic material comprising an O-ring mounted around a lip of the gasket suitable for being pressed against the actuating rod, the frame and the gasket forming a single-piece assembly suitable for being mounted in a housing of the application system.

7 Claims, 8 Drawing Sheets

(51) Int. Cl.
  *B05B 7/24*     (2006.01)
  *B05B 7/30*     (2006.01)

(56) References Cited

U.S. PATENT DOCUMENTS

| | | | | |
|---|---|---|---|---|
| 4,950,002 | A  * | 8/1990 | Hormansdorfer | F16J 15/062 |
| | | | | 277/625 |
| 5,984,316 | A  * | 11/1999 | Balsells | F16J 15/3212 |
| | | | | 277/553 |
| 8,720,902 | B2 * | 5/2014 | Kofler | F16J 15/002 |
| | | | | 277/558 |
| 2002/0153664 | A1* | 10/2002 | Schroeder | F16J 15/002 |
| | | | | 277/551 |
| 2011/0037234 | A1* | 2/2011 | Balsells | F16J 15/3212 |
| | | | | 277/562 |
| 2013/0043661 | A1* | 2/2013 | Binder | F16J 15/322 |
| | | | | 277/554 |
| 2014/0259606 | A1* | 9/2014 | Hedger | F16J 15/3204 |
| | | | | 29/428 |
| 2014/0265139 | A1* | 9/2014 | Dilmaghanian | F16J 15/3208 |
| | | | | 277/309 |

* cited by examiner

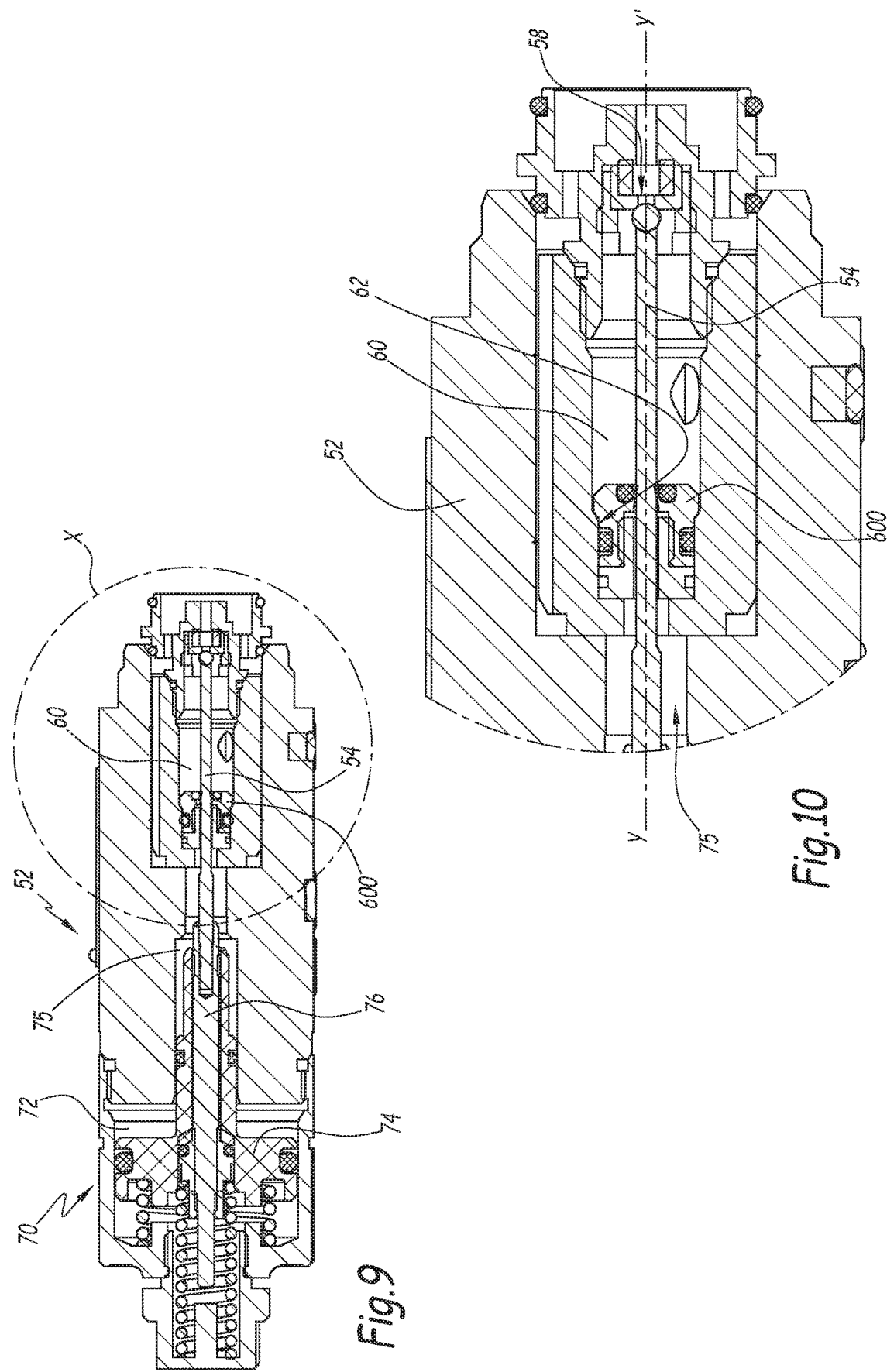

SEALING DEVICE AND APPLICATION SYSTEM COMPRISING SUCH A DEVICE

CROSS REFERENCE TO RELATED APPLICATIONS

This application claims priority under 35 USC § 119 of French Patent Application No. 15 60190 filed on Oct. 26, 2015.

FIELD OF THE INVENTION

The invention relates to a sealing device for a system for applying liquid coating products. The invention also relates to a system for applying liquid coating products comprising such a sealing device.

BACKGROUND OF THE INVENTION

The systems for applying liquid coating products, in particular paint, comprise a pump suitable for aspirating the paint by creating a vacuum using a piston, so as to orient the paint toward an outlet conduit connected to a spraying device, such as a gun. Such a system requires sealing the pump body relative to the part in which the paint circulates, in order to avoid malfunctions of the pump and the introduction of lubricant into the paint, in particular during movements of the piston rod.

To that end, the application systems comprise sealing devices, also called "cartridges". These devices comprise a metal frame mounted in a flange of the application system, an inner guide gasket and a lip seal suitable for sealably surrounding the rod of the piston of the application systems. This lip seal is pressed against the rod of the piston by metal springs forming a hollow in which the paint can accumulate and form dry deposits detrimental to the proper working of the application system.

The sealing and guide gasket must be mounted in the metal frame, which may cause damage and leaks and cause significant waste.

SUMMARY OF THE DESCRIPTION

The invention more particularly aims to resolve these drawbacks by proposing a new sealing device for a system for applying a liquid coating product that is easy to assemble and more reliable.

To that end, the invention relates to a sealing device for a system for applying a liquid coating product, this device comprising an inner conduit suitable for sealably surrounding an actuating rod of the application system. This sealing device is characterized in that it comprises a frame and a sealing gasket made from a synthetic material comprising an O-ring mounted around a lip of the gasket suitable for being pressed against the actuating rod, the frame and the gasket forming a single-piece assembly suitable for being mounted in a housing of the application system.

Owing to the invention, the sealing device forms a unitary whole and has fewer risks of deterioration during its assembly and mounting in a system for applying a coating product.

According to advantageous, but optional aspects of the invention, such a sealing device may incorporate one or more of the following features, considered in any technically allowable combination:

The gasket is screwed in the frame.

The frame comprises an outer peripheral groove suitable for receiving an elastic blocking ring for blocking the sealing device in the application system.

The sealing device comprises a flat scraping gasket arranged on an inner side of the sealing device and suitable for being in contact with the actuating rod.

The flat scraping gasket is mounted against a shoulder of the frame and locked by a ring crimped in the frame against the flat scraping gasket.

The sealing gasket comprises an O-ring mounted in a groove arranged on the outer wall of the gasket.

The invention also relates to a system for applying a liquid coating product comprising a sealing device, this application system comprising a pump body and a conduit for aspirating coating product, and a flange connecting the pump body and the conduit for aspirating coating product. This application system is characterized in that the sealing device is mounted in the flange, and in that the sealing device prevents the passage of the coating product toward the pump body and the passage of lubricating product situated in the pump body toward the conduit for aspirating coating product.

According to another advantageous, but optional aspect of the invention, the gasket of the sealing device does not extend in an inner space of the flange over more than 5 mm.

The invention also relates to a system for spraying liquid coating product comprising a sealing device, the system comprising a gun for spraying the product provided with a needle. This sealing system is characterized in that the sealing device is mounted around the needle so as to prevent the coating product from leaving an inner area of the gun.

According to one advantageous, but optional aspect of the invention, the needle can be actuated by a manual lever or by a jack.

BRIEF DESCRIPTION OF THE DRAWINGS

The invention will be better understood, and other advantages thereof will appear more clearly, in light of the following description of a sealing device and an application system according to its principle, provided as a non-limiting example in reference to the appended drawings, in which:

FIG. 9 is a longitudinal sectional view of an application system according to a third embodiment of the invention, comprising a sealing device similar to that of FIG. 8, FIG. 10 is an enlarged view of detail X in FIG. 9.

DETAILED DESCRIPTION

Figure 1:
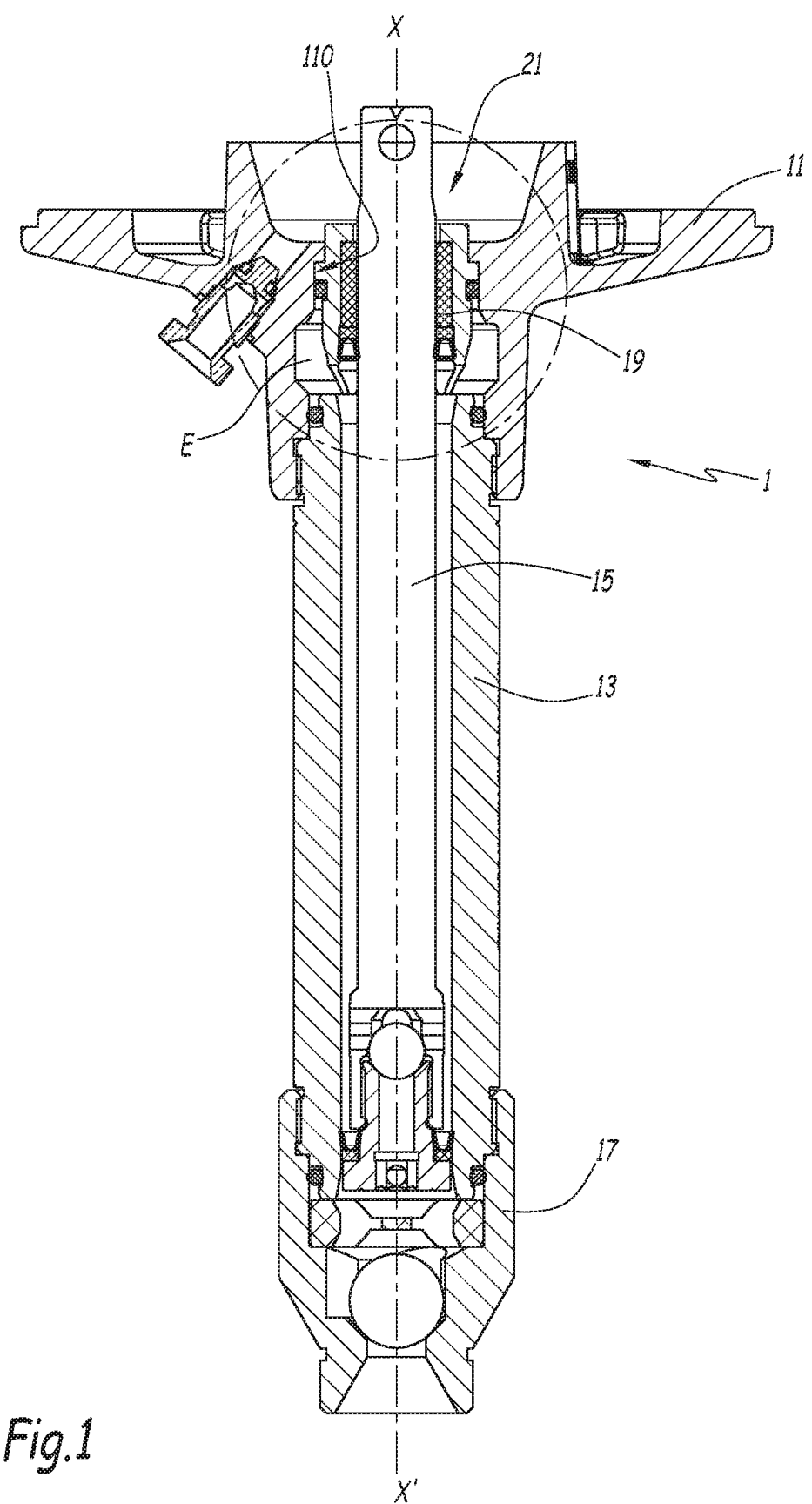
FIG. 1 is a section of part of an application system comprising a known sealing device of the prior art.
Figure 2:
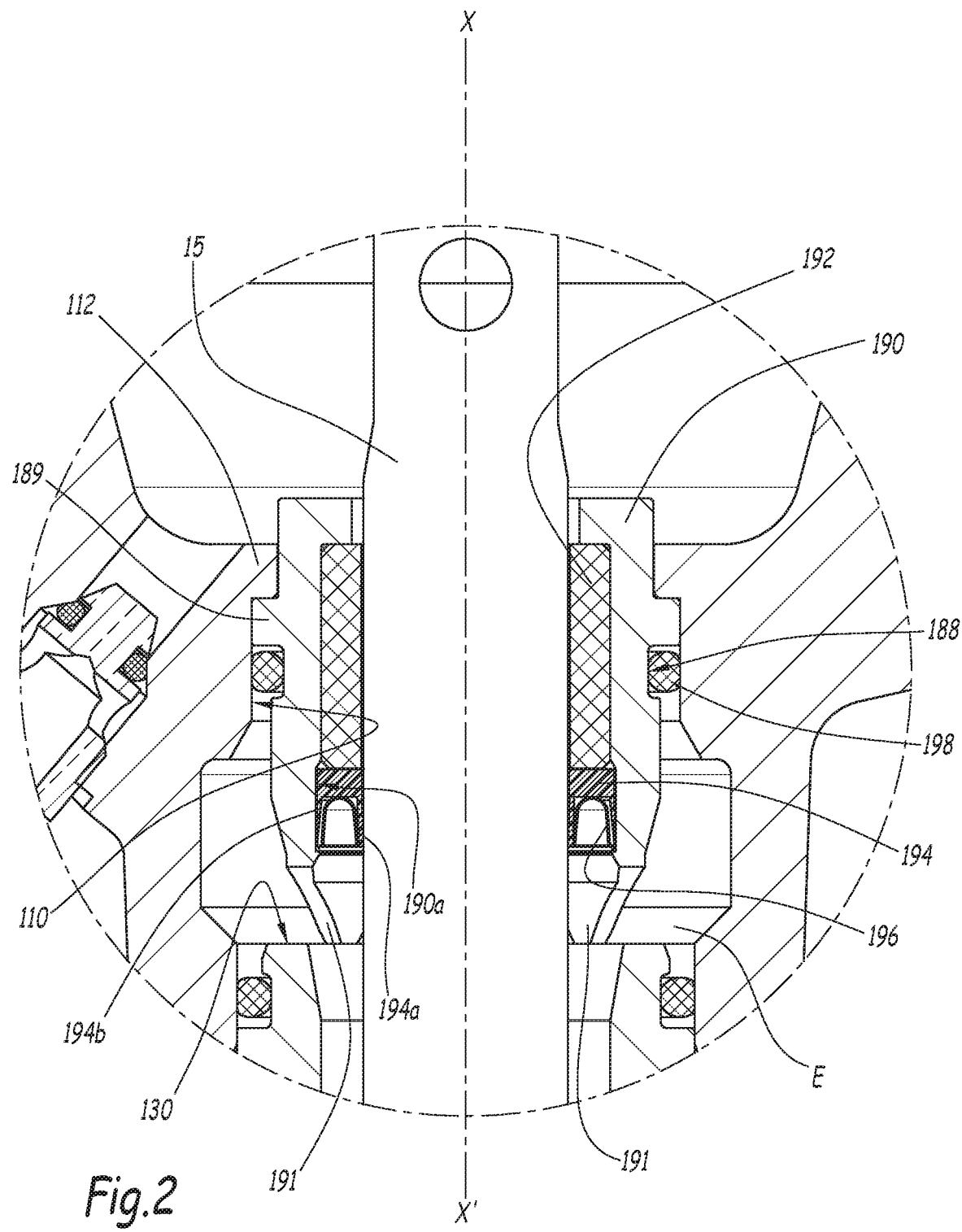
FIG. 2 is an enlarged view of detail II of the known sealing device of the prior art shown in FIG. 1.

FIGS. 1 and 2 show a known sealing device of the prior art integrated into a system for applying a liquid coating product, only part of which is shown in FIG. 1 with reference 1. The application system 1 comprises a flange 11 on which a tube 13 is fastened in which a piston rod 15 is mounted extending along a longitudinal axis X-X'. The tube 13 forms a conduit for aspirating the coating product and ends with a valve device 17, intended to be submerged in a reservoir, not shown, containing the liquid coating product, for example a paint. The flange 11 comprises an inner bore 110 in which a sealing device 19 is mounted centered around a central axis combined with the axis X-X', making it possible to fluidly isolate the part of the system 1 situated on the side of the tube 13 and another part of the system 1, defining a cavity 21, being part of a pump body visible in FIG. 3, and the function of which is to actuate the translation of the piston rod 15 along the axis X-X' in order to create a vacuum in the tube 13 and aspirate the coating product. The piston rod 15 forms an actuating rod of the application system. This operating principle is well known by those skilled in the art and will not be more fully described in the following.

Below, the adjectives "radial" and "axial" are used in reference to the axis X-X'.

As shown more precisely in FIG. 2, the sealing device 19 comprises a metal frame 190, mounted in the bore 110, and in which a guide ring 192 is mounted. The guide ring 192 is in contact with the piston rod 15 in order to guide the piston rod 15. The sealing device 19 further comprises a lip seal 194, comprising a first lip 194a situated on the inner side and in contact with the piston rod 15, and a second lip 194b, situated on the outer side and in contact with an inner wall 190a of the metal frame 190. The lips 194a and 194b are respectively pressed against the piston rod 15 and the frame 190 by an annular spring 196, the cross-section of which forms a "U", and which is mounted in the radial space defined by the lips 194a and 194b.

On the side of the tube 13, the metal frame 190 comprises feet 191 suitable for pressing against an axial edge 130 of the tube 13. These feet 191 keep the frame 190 pressed against a shoulder 110 of the flange 11, the metal frame comprising a shoulder 189 opposite the shoulder 112.

The sealing device 19 also comprises an O-ring 198 mounted in a groove 188 of the metal frame 190, and suitable for producing the sealing between the metal frame 190 and the bore 110.

The sealing device 19 known from the prior art has the drawback of comprising several parts that are relatively impractical to mount and causes the deterioration of the inner lip seal 194 when the latter is mounted in the frame 190, and when the piston rod 15 is mounted through the sealing device 19. Furthermore, the lip seal 194 comprising an inner annular spring 196 forms dead spaces in which the paint may accumulate and dry.

Furthermore, the presence of the feet 191 making it possible to keep the sealing device 19 against the tube 13 means that the sealing device protrudes over a significant length in the part of the application system in which the paint circulates; i.e., an inner space E formed by the inner volume of the flange 11 and that communicates with the inside of the tube 13, which causes the accumulation of paint and dry deposits that may deteriorate the operation of the application system, in particular the movement of the piston rod 15.

Figure 3:
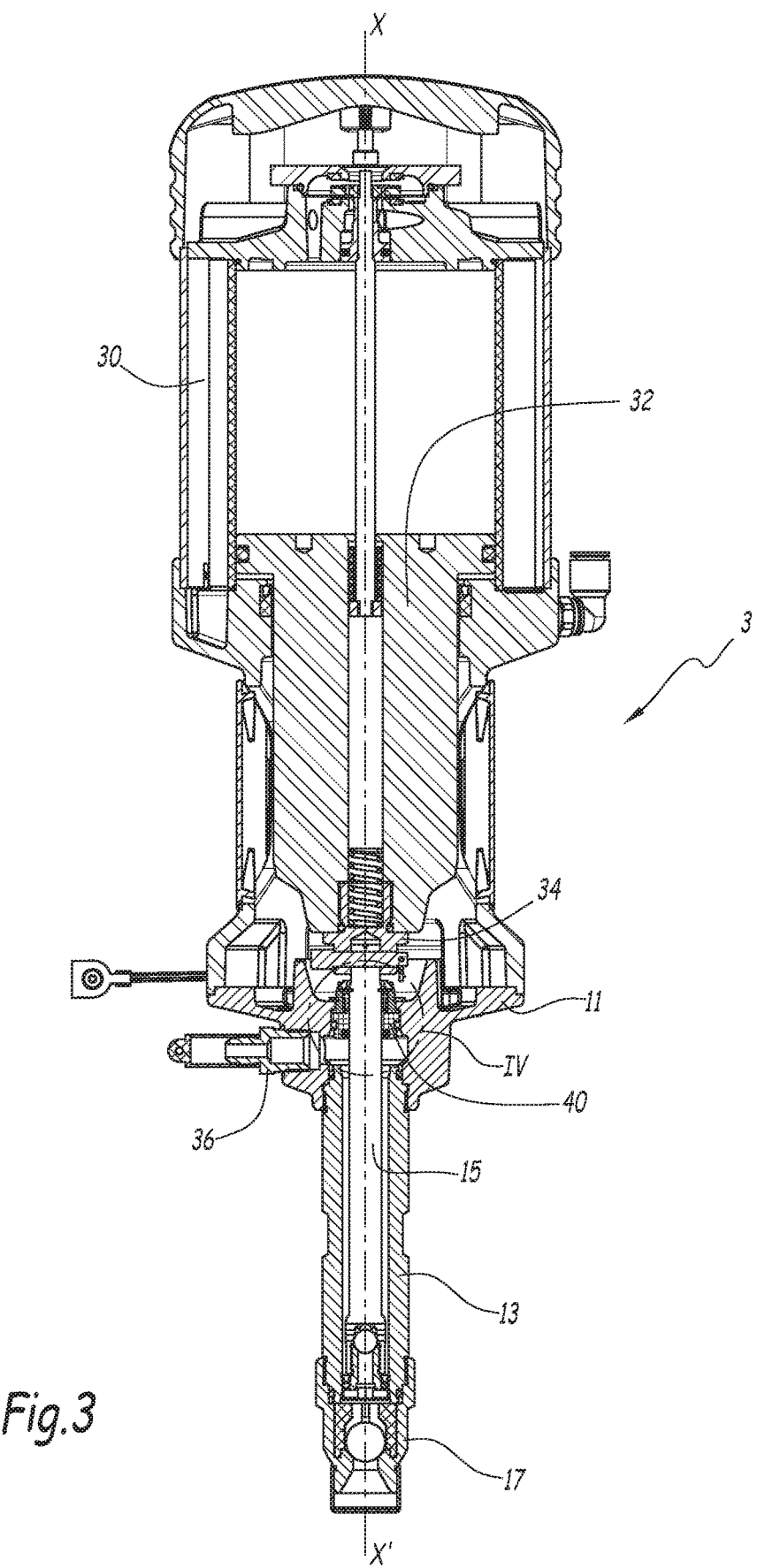
FIG. 3 is a longitudinal sectional view of an application system comprising a sealing device, according to a first embodiment of the invention.
Figure 4:
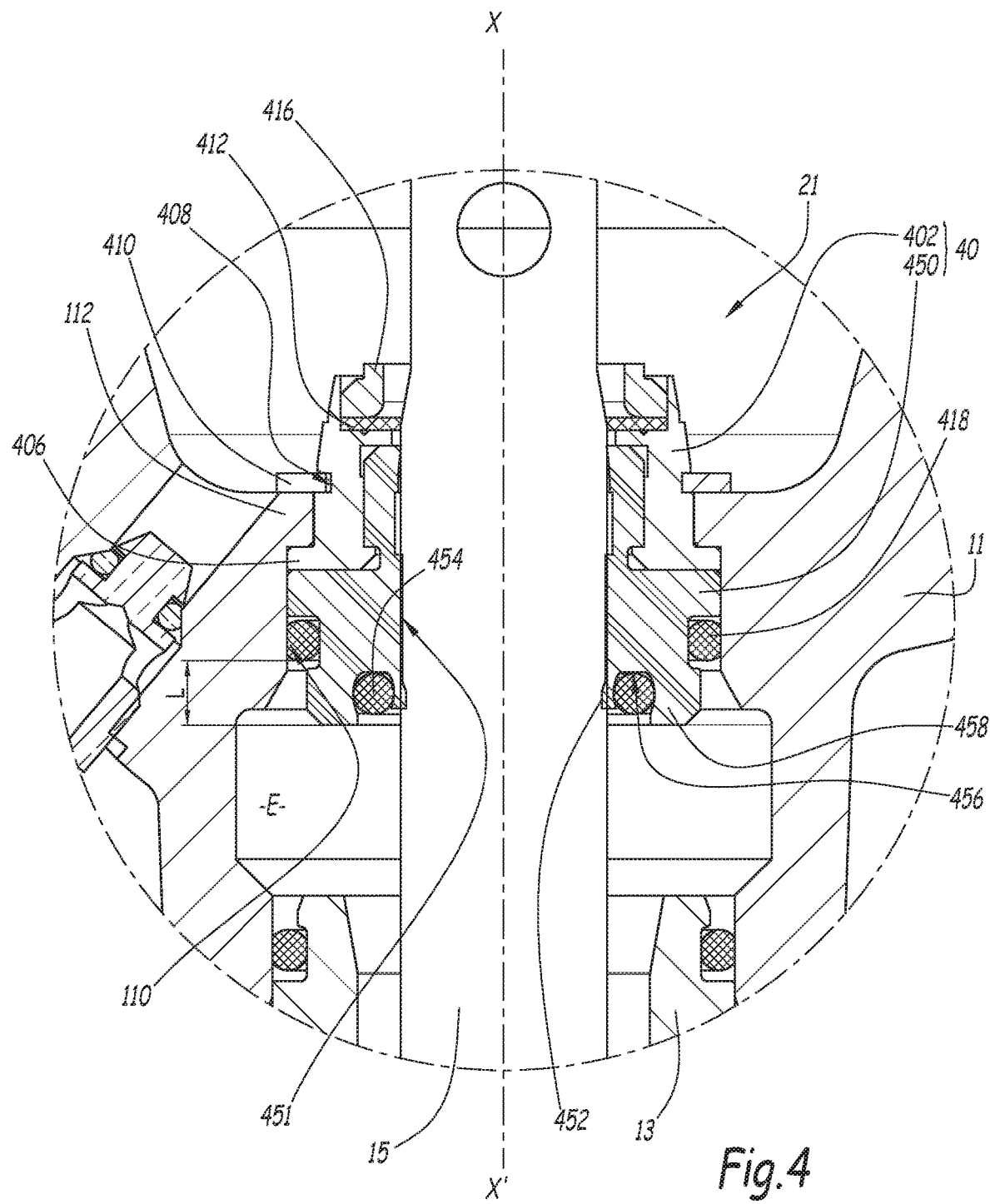
FIG. 4 is an enlarged view of detail IV in FIG. 3.
Figure 5:
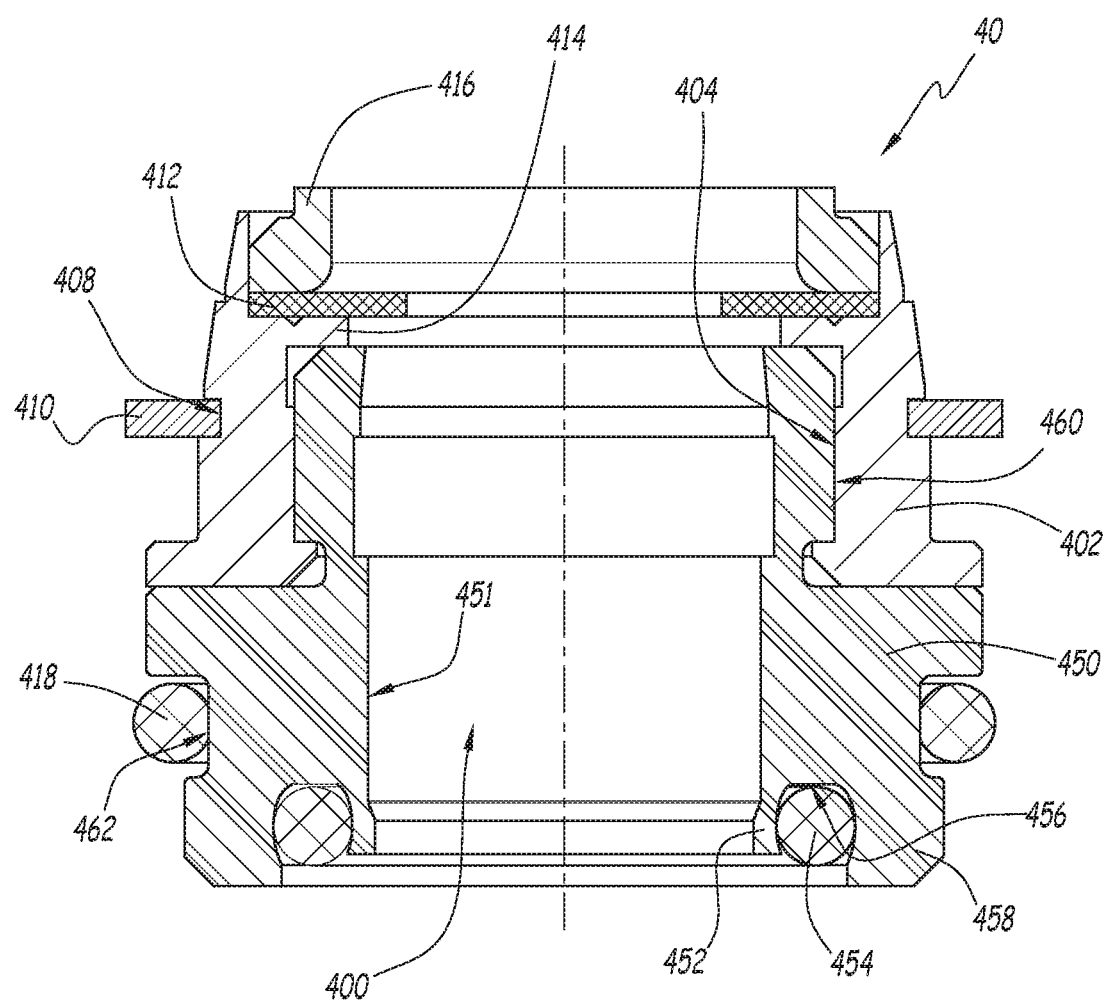
FIG. 5 is an enlarged sectional view of the sealing device of FIG. 4, in a non-mounted configuration.

FIGS. 3 to 5 show an application system and a sealing device according to a first embodiment of the invention.

FIG. 3 is a longitudinal sectional view of an application system 3, which comprises, as is the case for the system 1 shown in FIGS. 1 and 2, a flange 11, a tube 13, a piston rod 15, a valve 17, and a cavity 21, the operation of which is identical to that of the system 1.

FIG. 3 also shows a pump body 30 comprising a piston head 32 connected to the piston rod 15 by connecting elements 34. An outlet conduit 36 is screwed in a bore of the flange 11 so as to allow the connection of a paint supply conduit, not shown, of a paint spraying device.

The application system 3 comprises a sealing device 40 shown more precisely in FIGS. 4 and 5. The sealing device 40 comprises an inner conduit 400 suitable for sealably surrounding the piston rod 15.

The device 40 comprises a frame 402 and a gasket 450 made from a synthetic material. The frame 402 may be metallic, for example made by machining. Alternatively, the frame 402 may be made of synthetic material, for example made of plastic injection.

The device 40 is mounted in the bore 110 of the flange 11, which forms a housing. The gasket 450 comprises a cylindrical surface 451 suitable for surrounding and guiding the piston rod 15, and extended by a lip 452. This lip 452 is pressed against the piston rod 15 owing to an O-ring 454 mounted in a groove 456 extending radially between the lip 452 and an edge 458 of the gasket 450 extending on the side of the tube 13.

The gasket 450 comprises, on its part oriented on the side of the cavity 21, a thread 460, suitable for being screwed in a corresponding tapping 404 provided on an inner wall of the frame 402. The gasket 450 and the frame 402 form a single-piece assembly suitable for being mounted in the flange 11 in a single operation.

The frame 402 comprises a shoulder 406 that is mounted abutting against the shoulder 112 of the flange 11. In order to lock the mounting of the sealing device 40 of the flange 11, the frame 402 also comprises an outer peripheral groove 408 suitable for receiving an elastic ring 410, which rests against a rim of the flange 11 situated on the side of the cavity 21.

The device 40 also comprises a flat scraping gasket 412 arranged on an inner side of the sealing device 40 and suitable for being compressed against the piston rod 15. The flat scraping gasket 412 is mounted against a shoulder 414 of the frame 402 and locked by a ring 416 crimped in the frame 402 against the flat scraping gasket 412.

The device 40 also comprises an O-ring 418 mounted in a groove 462 arranged on the outer wall of the gasket 450, and suitable for being compressed against the surface of the bore 110.

As shown in FIG. 4, the gasket 450 extends in the space E over a length L of 4.15 mm from the seal 418. More generally, the gasket 450 does not extend in the space E over more than 5 mm. In other words, the bulk of the gasket 450 in the space E is reduced relative to that of the sealing device 19 of FIGS. 1 and 2, which makes it possible to reduce the dead spaces in which the paint may accumulate and dry.

The sealing device 40 also makes it possible to prevent the passage of the coating product situated in the inner space E toward the pump body 30 and the passage of lubricating product situated in the pump body 30 toward the tube 13, along the piston rod 15.

Figure 6:
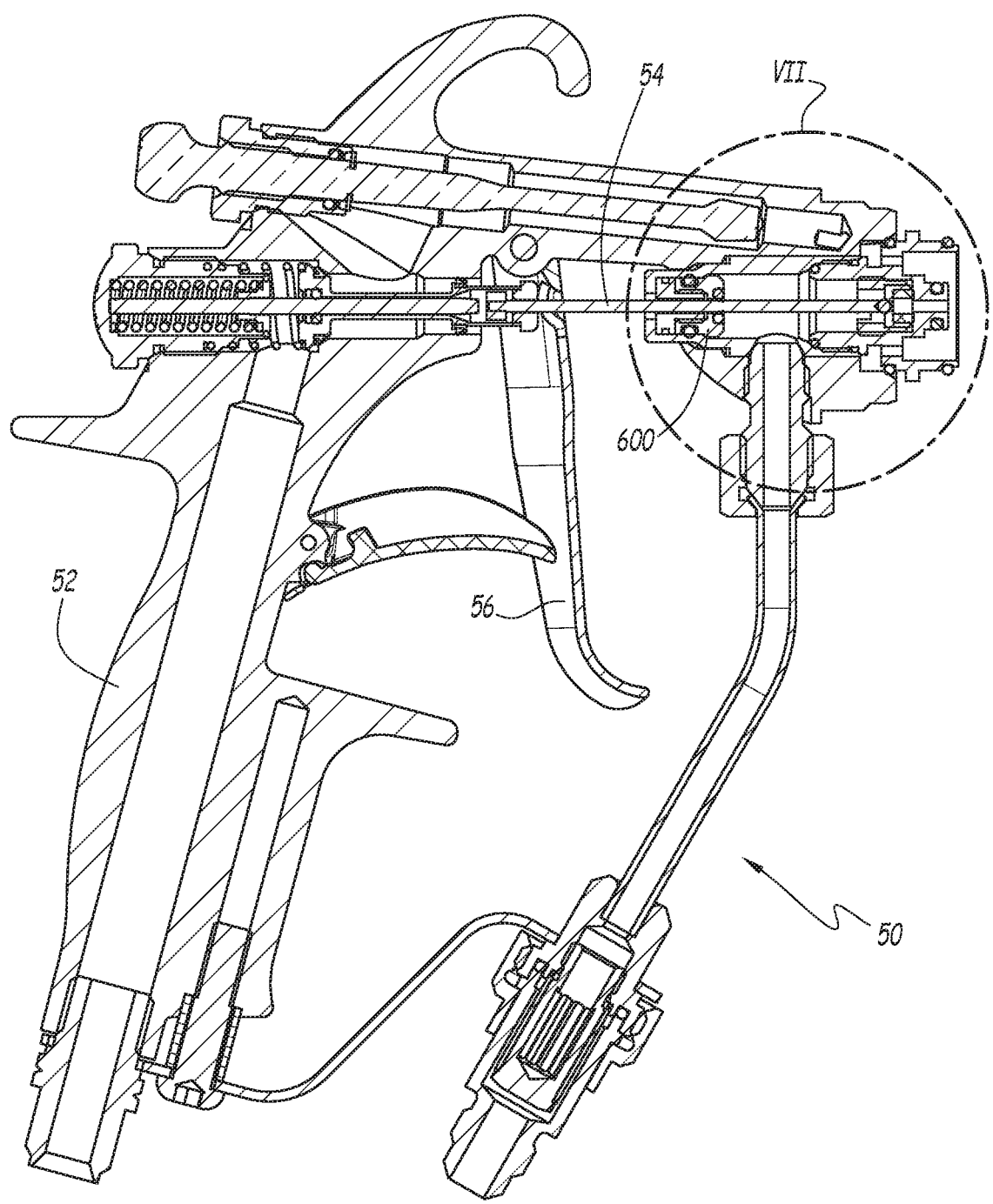
FIG. 6 is a sectional view of an application system comprising a sealing device, according to a second embodiment of the invention.
Figure 7:
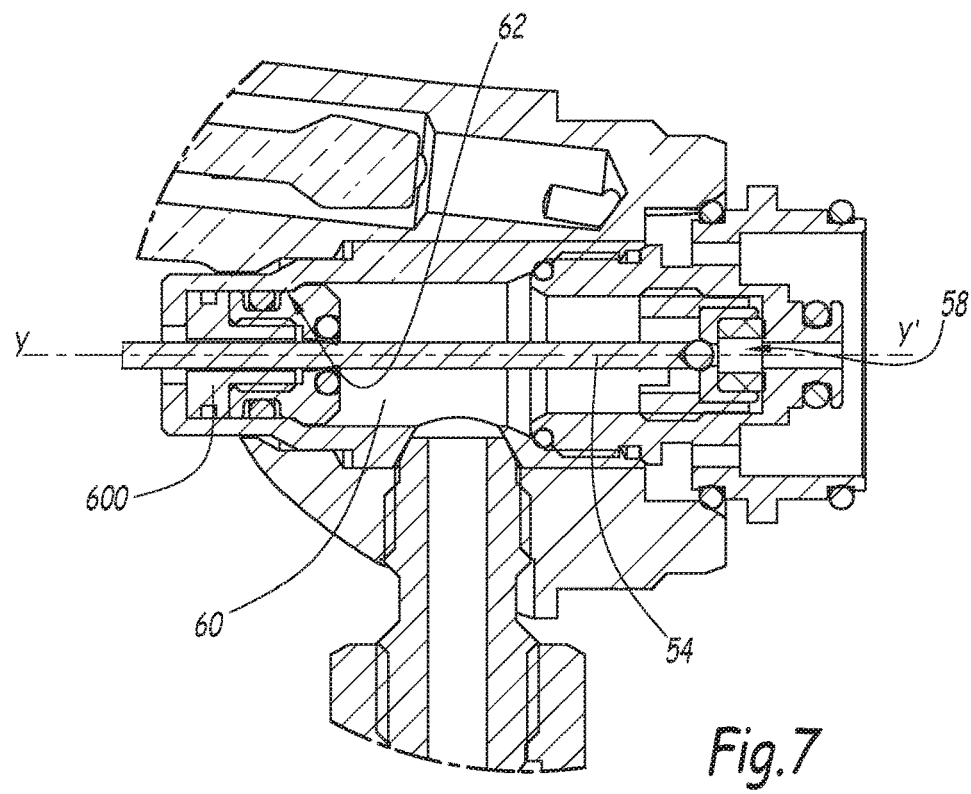
FIG. 7 is an enlarged view of detail VII of FIG. 6.
Figure 8:
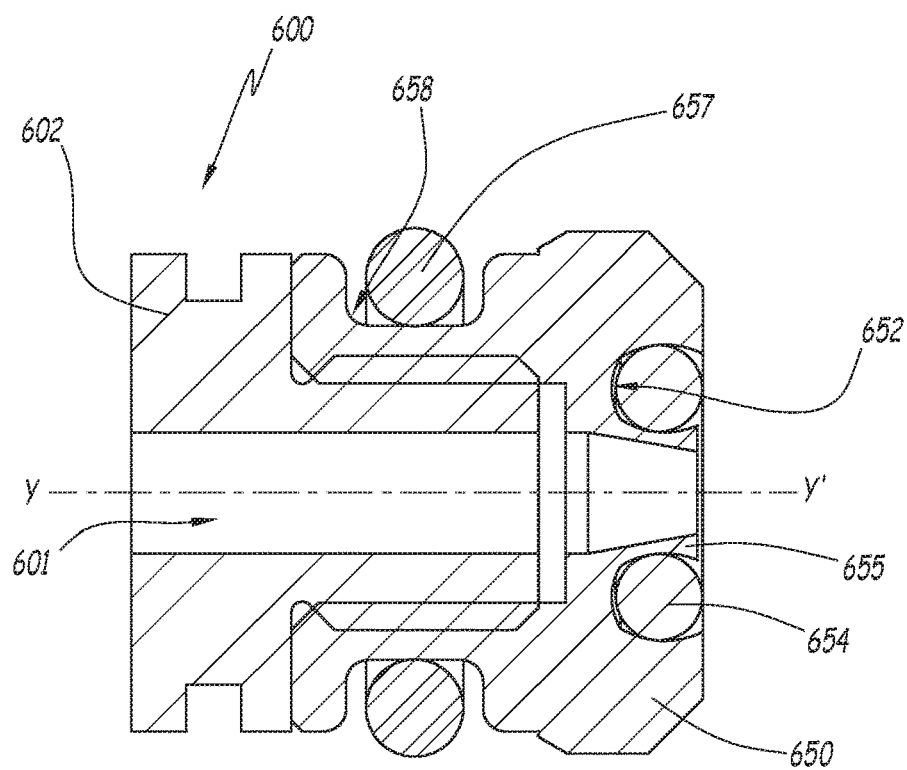
FIG. 8 is an enlarged view of the sealing device of FIG. 7, in a non-mounted configuration.

A second embodiment of the invention is shown in FIGS. 6-8. In this embodiment, a sealing device 600 according to the invention is integrated into a system 50 for applying a liquid coating product, such as a paint, comprising a gun 52 for spraying the coating product. This gun 52 includes a needle 54, forming an actuating rod of the application system 50, translatable along an axis Y-Y' shown in FIGS. 7 and 8. This needle 54 can be set in motion under the action of a lever 56 belonging to the system 50 that can be actuated manually by a user. Alternatively, the needle 54 can be actuated directly by a jack, as described below in reference to FIGS. 9 and 10. In a known manner, the movement of the needle 54 along the axis Y-Y' makes it possible to open or close an outlet orifice 58 for the coating product. The needle 54 extends partially outside the gun 52, and the device 600 is mounted around the needle 54 between an inner space 60 of the gun 52 and the outside environment of the gun 52, so as to prevent the coating product from leaving the inner space 60 toward the outside of the gun 52 during the maneuvering of the needle 54. The sealing device 600 has a structure similar to that of the device 40, and includes a conduit 601 in which the needle 54 is mounted. The device 600 comprises a frame 602 and a gasket 650 mounted in the frame 602 by screwing. The gasket 650 comprises an O-ring 654 mounted in a groove 652 of the gasket 650, and suitable for pressing a lip 655 of the gasket 650 against the needle 54. The device 600 also comprises an O-ring 657 mounted in an outer groove 658 of the gasket 650. The O-ring 657 is pressed against an inner surface 62 of the gun 52, forming a housing of the sealing device 600.

In the example shown in FIGS. 6 to 8, the sealing device 600 does not comprise a flat scraping gasket or an elastic ring allowing it to be fastened in the gun 52. According to one alternative that is not shown, the device 600 may comprise such a flat scraping gasket and such an elastic ring.

A third embodiment of the invention is shown in FIGS. 9 and 10. This embodiment differs from the embodiment of FIGS. 6 to 8 in that the needle 54 of the gun 52 is actuated directly by a jack 70 belonging to the system 50. The jack 70 comprises a chamber 72 provided on an opposite side of the gun 52 relative to the outlet orifice 58, and a piston 74 mounted in the chamber 72 and comprising a rod 76 aligned on the axis Y-Y' and fastened to the needle 54. The rod 76 is housed in a bore 75 extending between the inner space 60 and the chamber 72. The sealing device 600 is provided between the inner space 60 and the bore 75, and prevents coating product from leaking outside the inner space 60 toward the bore 75, and prevents foreign substances, such as lubricant products coming from the jack 70, from penetrating the inner space 60 during the sliding of the needle 54.

In general, in the embodiment of FIGS. 6-10, the inner space 60 designates the sealed volume of the gun 52 in which the coating product passes before leaving through the orifice 58, this sealed volume necessarily having to be preserved from any intrusions of foreign substances and prevent leaks of the coating product.

In FIG. 9, the jack 70 is shown as a pneumatic or hydraulic jack, working by contribution of a pressurized fluid in the chamber 72. In an alternative that is not shown, the jack 70 can be an electric jack.

In general, the invention can be used in a paint pump, a spray gun, or even in a solvent selector.

The features of the embodiments and alternatives described above may be combined to form new embodiments of the invention.

The invention claimed is:

1. A sealing device for a system for applying a liquid coating product comprising:
   an inner conduit suitable for sealably surrounding an actuating rod of an application system;
   a frame comprising an outer peripheral groove;
   a sealing gasket made from a synthetic material comprising an O-ring mounted around a lip of the sealing gasket suitable for being pressed against the actuating rod, said frame and the sealing gasket forming a single-piece assembly prior to being mounted on the actuating rod;
   a flat scraping gasket arranged on an inner side of the sealing device and suitable for being in contact with the actuating rod, mounted against a shoulder of said frame and locked by a ring crimped in said frame against the flat scraping gasket, wherein the shoulder of said frame abuts an end of said sealing gasket; and
   an elastic blocking ring positioned in said outer peripheral groove and protruding out of said frame, for blocking axial movement of the sealing device along the actuating rod in the application system.

2. The sealing device according to claim 1, wherein said sealing gasket is screwed into said frame.

3. The sealing device according to claim 1, comprising an O-ring mounted in a groove arranged on an outer wall of said sealing gasket.

4. A system for applying a liquid coating product comprising:
   a pump body;
   a conduit for aspirating coating product;
   a flange connecting said pump body and said conduit for aspirating coating product; and
   a sealing device mounted in said flange, for applying a liquid coating product, comprising:
      an inner conduit suitable for sealably surrounding an actuating rod of an application system;
      a frame comprising an outer peripheral groove;
      an O-ring;
      a sealing gasket made from a synthetic material comprising said O-ring mounted around a lip of the sealing gasket suitable for being pressed against the actuating rod, said frame and the sealing gasket forming a single-piece assembly flange prior to being mounted on the actuating rod;
      a flat scraping gasket arranged on an inner side of the sealing device and suitable for being in contact with the actuating rod, mounted against a shoulder of said frame and locked by a ring crimped in said frame against the flat scraping gasket, wherein the shoulder of said frame abuts an end of said sealing gasket; and
      an elastic blocking ring positioned in said outer peripheral groove and protruding out of said frame, for blocking axial movement of the sealing device along the actuating rod in the application system,
   wherein said sealing device prevents the passage of the coating product toward said pump body and the passage of lubricating product situated in said pump body toward said conduit for aspirating coating product.

5. The system according to claim 4, wherein said sealing gasket of said sealing device does not extend in an inner space of said flange over more than 5 mm.

6. A system for spraying liquid coating product comprising:
   a gun for spraying the product comprising a needle; and
   a sealing device mounted around said needle, for applying a liquid coating product, comprising:
      an inner conduit suitable for sealably surrounding an actuating rod of an application system;
      a frame comprising an outer peripheral groove;
      an O-ring;
      a sealing gasket made from a synthetic material comprising said O-ring mounted around a lip of the sealing gasket suitable for being pressed against the actuating rod, said frame and the sealing gasket forming a single-piece assembly prior to being mounted on the actuating rod;
      a flat scraping gasket arranged on an inner side of the sealing device and suitable for being in contact with the actuating rod, mounted against a shoulder of said frame and locked by a ring crimped in said frame against the flat scraping gasket, wherein the shoulder of said frame abuts an end of said sealing gasket; and an elastic blocking ring positioned in said outer peripheral groove and protruding out of said frame, for blocking axial movement of the sealing device along the actuating rod in the application system, wherein said sealing device prevents the coating product from leaving an inner area of said gun.

7. The system according to claim 6, wherein the needle is actuated by a manual lever or by a jack.

\* \* \* \* \*